(12) United States Patent
Hirosawa

(10) Patent No.: US 6,895,167 B2
(45) Date of Patent: May 17, 2005

(54) INFORMATION REPRODUCING SYSTEM AND INFORMATION REPRODUCING METHOD

(75) Inventor: Yasuhiro Hirosawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 859 days.

(21) Appl. No.: 09/820,989

(22) Filed: Mar. 30, 2001

(65) Prior Publication Data

US 2001/0031133 A1 Oct. 18, 2001

(30) Foreign Application Priority Data

Apr. 3, 2000 (JP) .......................................... 2000-100336

(51) Int. Cl.[7] .............................................. H04N 5/91
(52) U.S. Cl. ............................. 386/68; 386/13; 386/81
(58) Field of Search ............................. 386/1, 6–8, 13, 386/46, 68, 81, 124

(56) References Cited

U.S. PATENT DOCUMENTS

| | | | | |
|---|---|---|---|---|
| 4,459,620 A | * | 7/1984 | Abe et al. ...................... | 386/6 |
| 5,377,051 A | * | 12/1994 | Lane et al. .................... | 386/81 |
| 5,416,599 A | * | 5/1995 | Ubukata et al. ............... | 386/13 |
| 5,963,703 A | * | 10/1999 | Higurashi et al. ............. | 386/68 |
| 6,243,529 B1 | * | 6/2001 | Takayama et al. ............. | 386/68 |

FOREIGN PATENT DOCUMENTS

JP        11203749        7/1999

* cited by examiner

Primary Examiner—Thai Tran
Assistant Examiner—Christopher Onuaku
(74) Attorney, Agent, or Firm—Birch, Stewart, Kolasch & Birch, LLP

(57) ABSTRACT

An information reproducing system having a track format in which information for an n-times speed reproduction are arranged in advance at predetermined positions on a recording track of a recording medium, including control signal reproducer for reproducing a control signal indicating the positional relation of the recording track, a rotary drum including a head for reproducing data signals from the recording medium, drum phase signal outputting unit for outputting a signal indicating the rotational phase of the rotary drum, head dislocation detector for determining, after a head scanning portion to be reproduced by the head at the n-times speed reproduction, a dislocation from the track position to be reproduced, and phase controller for controlling the phase relation between the output of the control signal reproducer and the output of the drum phase signal outputting unit, on the basis of the determined dislocation.

7 Claims, 14 Drawing Sheets

INFORMATION REPRODUCING SYSTEM AND INFORMATION REPRODUCING METHOD

BACKGROUND OF THE INVENTION

1. Field of the Invention

The present invention relates to an information reproducing system and an information reproducing method for obtaining a reproduced image of an n-times speed from a recording medium in which data encoded from video signals are recorded.

2. Description of the Related Art

Here will be described the actions of a magnetic recording/reproducing system of the prior art by taking the VTR (Video Tape Recorder) of the digitally recordable D-VHS (Registered Trademark) as an example. FIG. 13 is a block diagram showing a construction of the VTR of the prior art.

In FIG. 13, numeral 1 designates a drum; numeral 2 a pair of heads mounted on the drum 1 diametrically oppositely to each other at 180 degrees to have inverse azimuths; numeral 3 a capstan motor for running a tape; numerals 4 and 5 switches; numeral 6 a magnetic tape; numeral 7 a control (hereinafter abbreviated to "CTL") head for recording/reproducing a CTL signal; numeral 8 a CTL reproduction amplifier; numeral 9 a phase control circuit; numeral 10 a speed control circuit; numeral 11 a reproduce amplifier; numeral 11 a reproduce amplifier; and numeral 12 a decoder; numeral 13 a CTL record amplifier; numeral 14 a record amplifier; numeral 15 an encoder; numeral 16 a monitor; and numeral 17 an FG (Frequency Generator) unit for outputting a signal of a period synchronized with the rotational period of the capstan motor 3.

At a recording time, the video signal, as inputted to the encoder 15, is encoded into digital data and sent to the record amplifier 14. At this time, the switch 4 is changed to the side of the record amplifier 14. The encoded video data, as outputted from the record amplifier 14, are recorded through the head 2 in the magnetic tape wound to run on the drum 1. The drum 1 is rotated in synchronism with the digital data to be recorded, and the capstan motor 3 is so controlled by the speed control circuit 10 and the phase control circuit 9 as to keep the period of the output of the FG unit 17 constant. At this time, on the other hand, the switch 5 is already changed to the side of the CTL record amplifier 13, from which the CTL signal synchronized with the video data is recorded through the CTL head 7 in the tape lower end.

FIG. 14 is an explanatory view of a track format to be recorded on the magnetic tape 2. In the tape lower end, there is recorded the CTL signal which is used at the reproduction time in the phase control of the capstan motor 3 for holding the tracking. In the recording track of the video data, there are buried in advance the video data for the n-times speed, the position of which is scanned by the head 2 to produce a reproduced image for the n-times speed reproduction.

At the reproduction, the output (FG signal) from the FG unit 17 is so controlled by the speed control circuit 10 that its period may be kept constant. At this time, on the other hand, the switch 5 is already changed to the side of the CTL reproduce amplifier 8 so that the reproduced output (CTL signal) from the CTL head 7 is inputted to the phase control circuit 9.

On the other hand, a PG signal of one pulse is inputted for one rotation of the drum from a PG unit 18 to a drum FF circuit 19. On the basis of the PG signal, the drum FF circuit 19 outputs a DFF signal indicating the rotational phase of the drum 1 and the timing for the head change, to the phase control circuit 9.

Where the output of the FG unit 17 is outside of a predetermined range, a fixed value is outputted from the phase control circuit 9 so that no phase control is made. Within the predetermined range, the control is made to keep a predetermined phase relation between the DFF signal indicating the rotational phase of the drum 1 and the CTL signal thereby to establish the tracking at the reproduction for the head 2 to scan the track. At this time, the switch 4 is changed to the side of the reproduce amplifier 11 so that the reproduced output from the head 2 is amplified and is sent as the video data to the decoder 12. In this decoder 12, the video data are decoded into a reproduced image, which is outputted to and displayed in the monitor 16.

Here will be described the n-times speed reproduction. At the video signal recording time, the data for the n-times speed reproduction are recorded together with the data for the ordinary reproduction in a predetermined track. At the n-times speed reproduction, the rotating speed of the capstan motor 3 is increased to n-times. If the FG signal and the CTL signal are divided into n-frequencies, however, the tracking can be stabilized as at the one-time speed reproduction by keeping the divided CTL signal and the rotational phase of the drum 1 constant. Since the CTL signal of n pulses is reproduced for one rotation of the drum 1, however, n-ways can be conceived on the tracking convergence positions of the head 2 and the track. Even if the tracking is stabilized, therefore, the n-times speed data are not sometimes be reproduced. Where the n-times speed data are not reproduced, the tracking position has to be changed by changing the phase target owned by the phase control circuit 9, by two tracks (or one CTL signal).

SUMMARY OF THE INVENTION

The recording/reproducing system of the prior art is constructed, as has been described hereinbefore, so that n CTL signals are reproduced at the n-times speed for one rotation of the drum 1. Even if the CTL signal and the drum 1 are kept in a phase relation to stabilize the tracking, therefore, the n-ways can be conceived on the tracking convergence position in dependence upon what CTL signal is used for the phase control during one rotation of the drum 1. Even if the tracking becomes stable, therefore, the n-times speed data may be unable to be reproduced. The tracking position has to be adjusted till the desired n-times speed data are obtained, and it may take a long time to produce the n-times speed reproduced image.

The present invention has been conceived to solve the above-specified problems and has an object to provide an information reproducing system capable of producing a reproduced image quickly even at the n-times speed reproduction.

According to a first aspect of the invention, there is provided an information reproducing system having a track format in which informations for an n-times speed reproduction (wherein n indicates an integer) are arranged in advance at predetermined positions on a recording track of a recording medium, comprising: control signal reproducing means for reproducing a control signal indicating the positional relation of the track recorded in said recording medium; a rotary drum including a head for reproducing data signals from said recording medium; drum phase signal outputting means for outputting a signal indicating the rotational phase of said rotary drum; head dislocation detecting means for determining, after a head scanning portion to be reproduced by said head at the n-times speed reproduction and the n-times speed reproduction were set, a dislocation from the track position to be reproduced; and phase control means for controlling the phase relation between the output of said control signal reproducing means and the output of said drum phase signal outputting means, on the basis of the dislocation determined by said head dislocation detecting means.

In the information reproducing system according to the first aspect, according to a second aspect of the invention, the head dislocation detecting means determines the dislocation from the recording position, at which the recording data to be reproduced at the n-times speed reproduction are recorded, by comparing a SYNC block signal indicating the track number, in which the recording data reproduced at the n-times speed reproduction are recorded with a SYNC block number indicating the position in the track and comparing the track number of the recorded data to be reproduced at the n-times speed reproduction with the SYNC block number.

In the information reproducing system according to the first aspect, according to a third aspect of the invention, the head dislocation detecting means determines the dislocation of such data for the n-times speed reproduction of the recorded data reproduced at the n-times speed reproduction as are recorded at a predetermined position of the recording track, and the track number, at which the recording data of the same SYNC block are recorded.

In the information reproducing system according to the first aspect, according to a fourth aspect of the invention, there is further comprised control means for keeping the phase relation between the CTL signal and the output signal from the drum phase signal outputting means, and the head dislocation detecting means determines the head dislocation from the video data which are reproduced while being controlled by said control means.

According to a fifth aspect of the invention, there is provided an information reproducing system having a track format in which information for an n-times speed reproduction (wherein n indicates an integer) is to be arranged in advance at predetermined positions on a recording track of a recording medium, comprising control signal recording/reproducing means for recording/reproducing a control signal indicating the positional relation of the track to be recorded in the recording medium; a rotary drum including a pair of heads for recording and reproducing data signals in and from said recording medium; drum phase signal outputting means for outputting a signal indicating the rotational phase of said rotary drum; tracking information generating means for generating information on the dislocation of another track with respect to a track in which the recording data for the n-times speed reproduction to be reproduced at first at the n-times speed reproduction are recorded; recording/reproducing means for recording and reproducing video data and for recording and reproducing the information of individual tracks, as generated by the tracking information generating means, in and from the individual tracks; and phase control means for controlling the phase relation between the output of said control signal reproducing means and the output of the drum phase signal outputting means, at the n-times speed reproduction on the basis of the dislocation recorded by the recording/reproducing means.

In the information reproducing system according to the fifth aspect, according to a sixth aspect of the invention, there is further comprised control means for keeping the phase relation between the CTL signal and the output signal from the drum phase signal outputting means, and the phase control means controls the phase relation between the output of the control signal recording/reproducing means and the output of the drum phase signal outputting means, on the basis of the head dislocation which is recorded together with the reproduced video data, while being controlled by the control means.

According to a seventh aspect of the invention, there is provided an information reproducing method having a track format in which information for an n-times speed reproduction (wherein n indicates an integer) is to be arranged in advance at predetermined positions on a recording track of a recording medium, wherein, on the basis of the dislocation between the track position to be reproduced by a head at the n-times speed reproduction and the track position to be reproduced after the n-times speed reproduction was set, the n-times speed reproduction is performed by controlling the phase relation between a control signal indicating the positional relation of the recording track and a drum phase signal indicating the phase of a rotary drum.

DETAILED DESCRIPTION OF THE PREFERRED EMBODIMENTS

Embodiments of the invention will be described in connection with the VTR of D-VHS.

Figure 1:
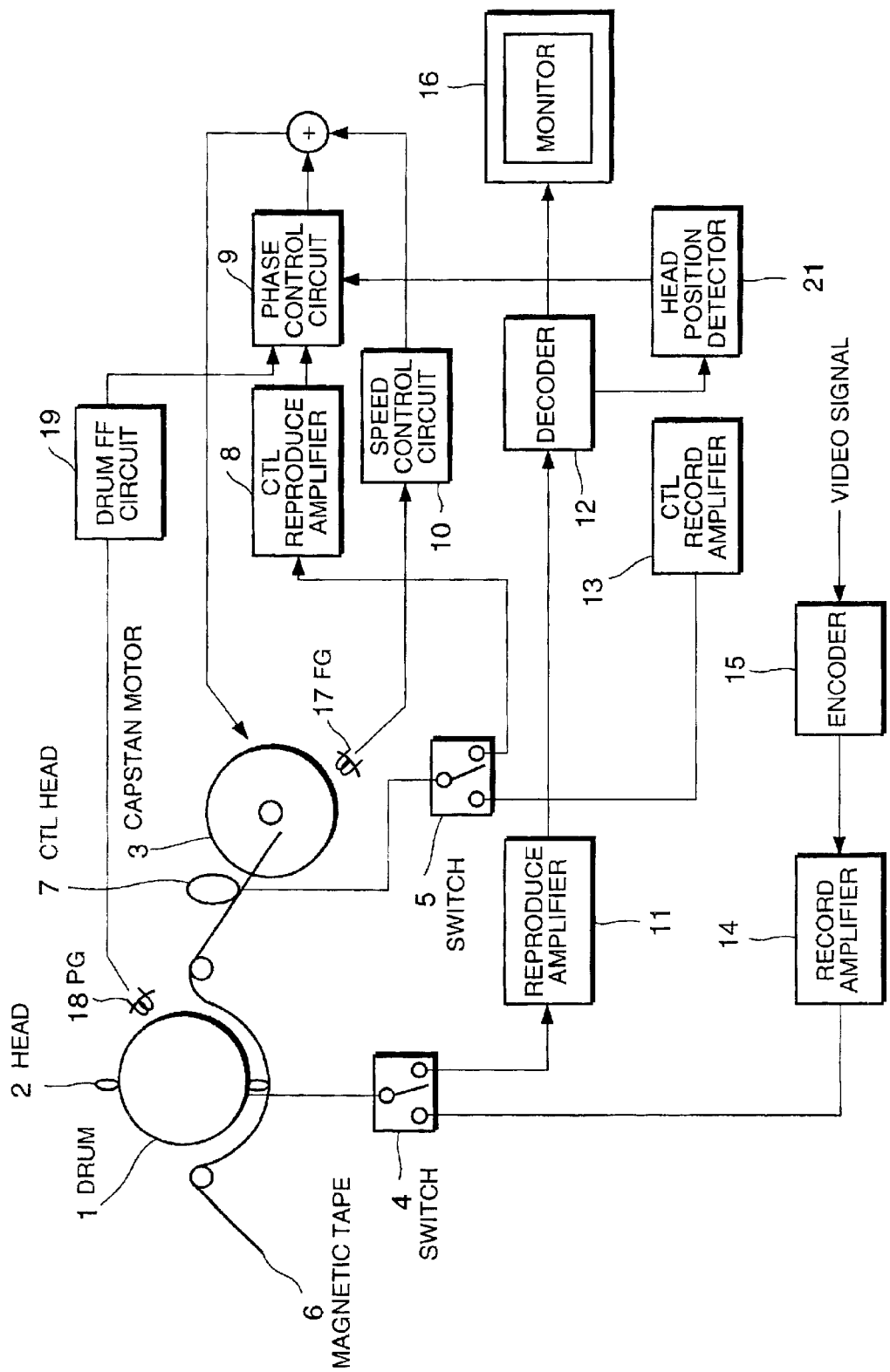
FIG. 1 is a diagram showing a system according to Embodiment 1 of the invention.

Embodiment 1:

FIG. 1 shows a construction of an information recording/reproducing system according to Embodiment 1 of the invention. In FIG. 1, numeral 1 designates a drum; numeral 2 a pair of heads mounted on the drum 1 diametrically oppositely to each other at 180 degrees to have inverse azimuths; numeral 3 a capstan motor for running a tape; numerals 4 and 5 switches; numeral 6 a magnetic tape; numeral 7 a CTL head for recording/reproducing a CTL signal; numeral 8 a CTL reproduction amplifier; numeral 9 a phase control circuit; numeral 10 a speed control circuit; numeral 11 a reproduce amplifier; numeral 11 a reproduce amplifier; and numeral 12 a decoder for decoding the video data reproduced. In this decoder 12, the reproduced digital signals are decoded into analog signals of NTSC or the like so that they may be projected in a monitor 16. At the same time, such informations (e.g., SYNC block numbers or track numbers) of the digital signals as relating to the head position detection are extracted and inputted to a head position detector.

Numeral 13 designates a CTL record amplifier for generating the CTL signal synchronized with the recording track, at the recording time and for recording the CTL signal in the tape lower end through the CTL head. At the reproducing time, the CTL signal reproduced by the CTL head is amplified by the CTL reproduce amplifier and shaped into a square wave. By controlling the reproduced CTL signal in a predetermined phase relation to a DFF signal, the head is enabled to scan the record track at the reproducing time to produce a reproduced signal. In short, the tracking can be kept.

Numeral 14 designates a record amplifier; numeral 15 an encoder for encoding a video signal inputted; the numeral 16 designates the monitor for displaying the video signal outputted from the decoder 12; numeral 17 an FG unit for outputting a period signal synchronized with the rotation of the capstan motor 3; and numeral 21 designates the head position detector for extracting the track number or the position of data in the track on the magnetic tape 6, from the reproduced data outputted from the decoder 12, to detect the head position with respect to the track.

At the recording time, the video signal inputted to the encoder 15 is encoded into digital data so that it is finely divided at the unit of 112 bytes called the "SYNC blocks". The track numbers for each SYNC block and the SYNC block numbers in the track are added to the video data, which are then sent to the record amplifier 14. At the recording time, the switch 4 is changed to the side of the record amplifier 14 so that the head 2 records the encoded video data in the magnetic tape 6.

The head 2 is composed of a pair of heads of different azimuths, and these paired heads record the video data alternately in the magnetic tape 6 so that the adjoining tracks recorded in the magnetic tape 6 have the inverse azimuths. At this time, on the other hand, the drum 1 rotates in synchronism with the recorded video data (or digital data), and the capstan motor 3 is so controlled by the speed control circuit 10 and the phase control circuit 9 as to keep the period of the FG unit 17 constant, and runs the magnetic tape 6 at a constant speed. On the other hand, the switch 5 is changed to the side of the CTL record amplifier 13 so that the CTL signal, as synchronized with the track of the video data recorded in the magnetic tape 6, is outputted from the CTL record amplifier 13 and is recorded in the lower end of the magnetic tape 6 by the CTL head 7.

At the reproducing time, in order to keep the running speed of the magnetic tape 6 constant, the output (FG signal) from the FG unit 17 is so controlled by the speed control circuit 10 that its period may be kept constant. At this time, on the other hand, the switch 5 is changed to the side of the CTL amplifier 8 so that the reproduced output (CTL signal) from the CTL head 7 is inputted to the phase control circuit 9.

To the phase control circuit 9, on the other hand, there is inputted from the drum FF circuit the DFF signal indicating the rotational phase of the drum 1. In this phase control circuit 9, the DFF signal and the CTL signal are controlled to have a predetermined phase relation to establish the tracking at the reproducing time. At the reproduction, the switch 4 is changed to the side of the reproduce amplifier 11 so that the output from the head 2 is amplified by the reproduce amplifier 11 and sent as the video data to the decoder 12. In this decoder 12, the video data are decoded into the reproduced image, which is outputted to and displayed in the monitor 16.

At an n-times speed reproduction, the rotating speed of the capstan motor 3 is n-times as high as that of the ordinary reproduction. If the FG signal and the CTL signal are divided into n-frequencies, however, the tracking at the n-times speed can be stabilized as at the one-time reproduction by keeping the frequency-divided CTL signal and the phase of the drum 1, i.e., the DFF signal in a predetermined phase relation.

Since the CTL signal is divided into the n-frequencies, there are n-convergence positions for the tracking. However, the head 2 is allowed to run only one of the positions (or tracks) in which the data for the n-times speed are recorded. Therefore, the proper tracking is performed by the following actions.

The data, as can be reproduced after the running speed of the tape was stabilized to the n-times speed, are the data which have been recorded in the track of the same azimuth as that of the head 2. The data for the n-times speed are decoded, if contained in the reproduced data, by the decoder 12 and outputted to the monitor 16 so that the n-times speed reproduced image can be obtained. Unless the n-times speed data are contained, the track number in the reproduced SYNC block and the SYNC block number are extracted to discriminate the position of the track being scanned by the head 2.

Figure 2:
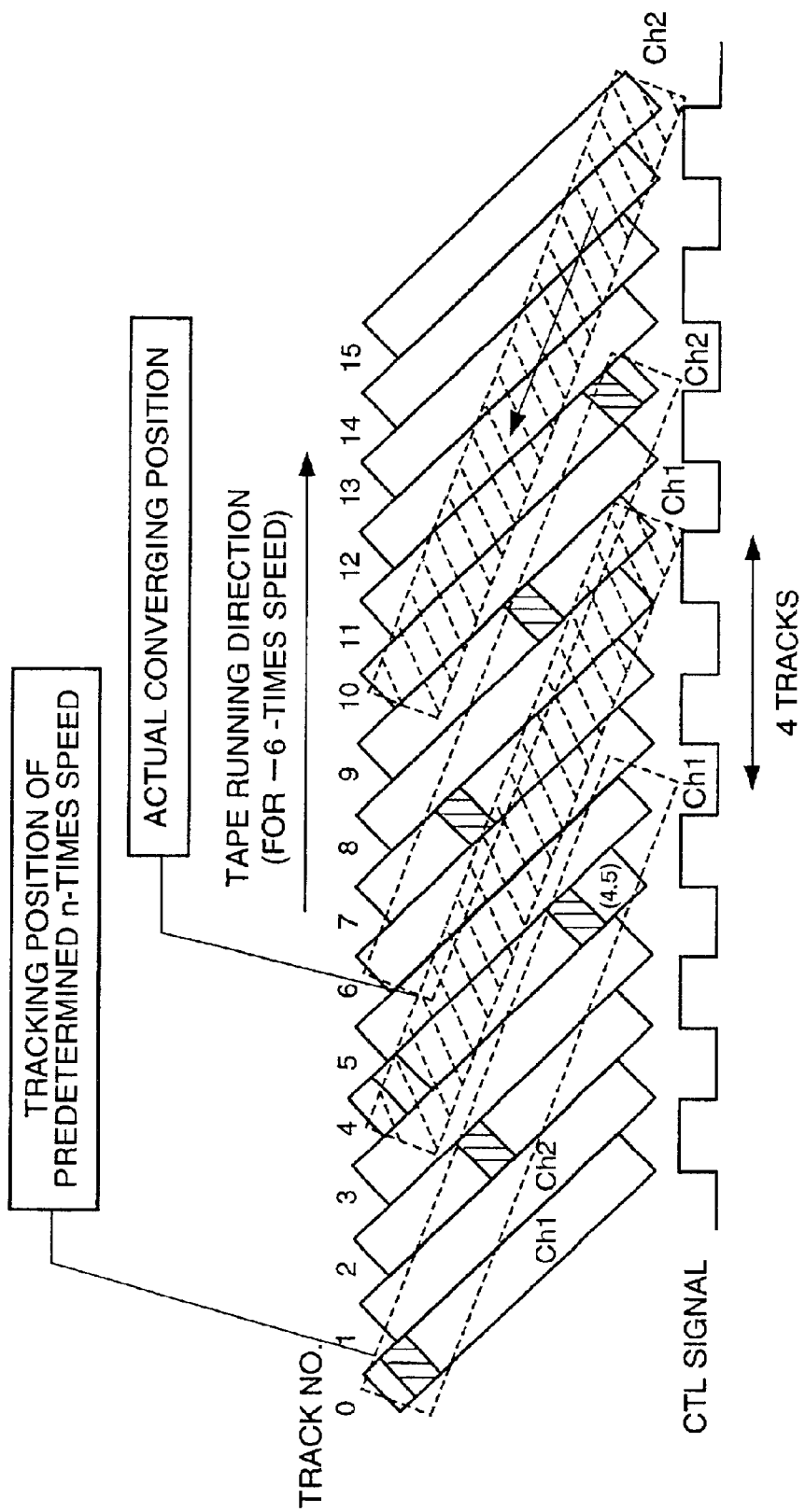
FIG. 2 is an explanatory diagram showing an example of detection of tracking positions by the system of Embodiment 1 of the invention.

FIG. 2 shows one example of the detection of tracking positions. Tracks of even numbers are recorded in the head of ch1, and tracks of odd numbers are recorded in the head of ch2. The reproductions can be made by the heads of the same azimuths as those of the tracks.

In FIG. 2, for example, with respect to the n-times speed tracking position, the actual tracking convergence position is delayed in phase by about four tracks so that the reproduced data have a track number 4 and a SYNC block number 15 (hereinafter expressed by (4, 15)). On the other hand, the data for n-times speed are arranged at the tracking position (4, 5) or (0, 15). The tracking dislocation canoe easily known if such a calculation table is prepared in the VTR that the tracking dislocation can be calculated from the position, in which the data for the n-times speed are arranged, and the position of the reproduced data which could be actually reproduced.

Figure 3:
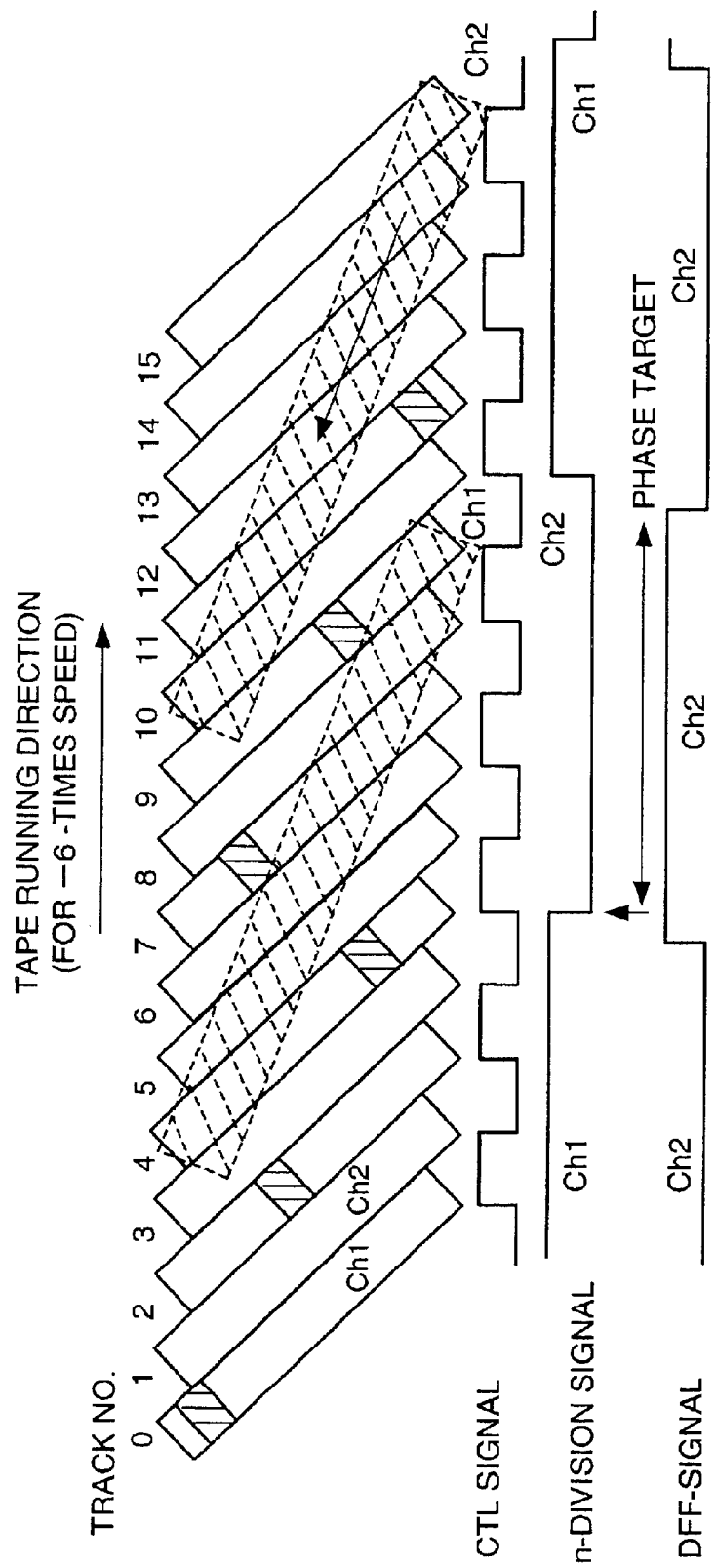
FIG. 3 is an explanatory diagram showing a convergence of tracking by the system of Embodiment 1 of the invention.
Figure 4:
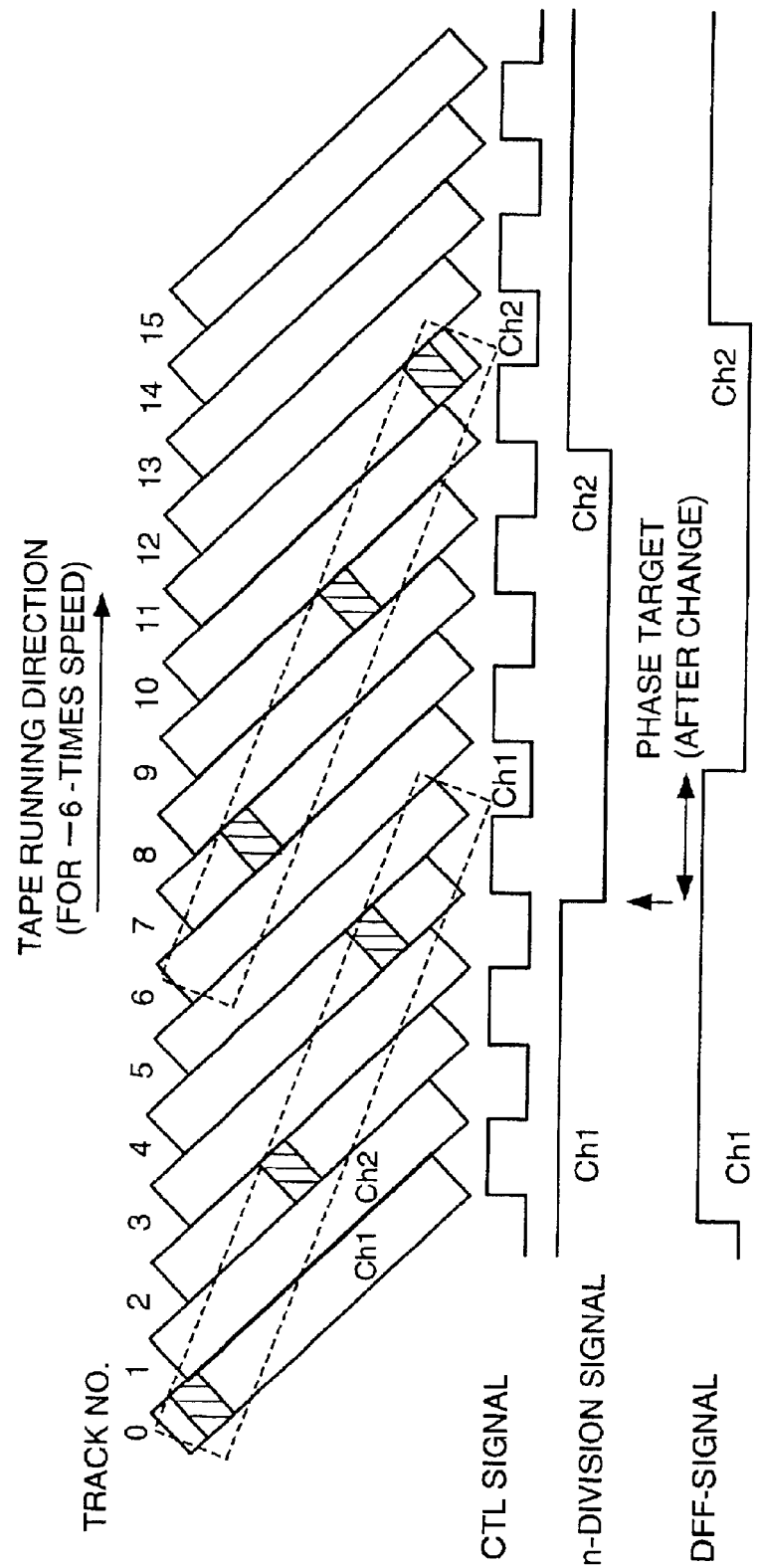
FIG. 4 is an explanatory diagram showing the convergence of tracking by the system of Embodiment 1 of the invention.
Figure 5:
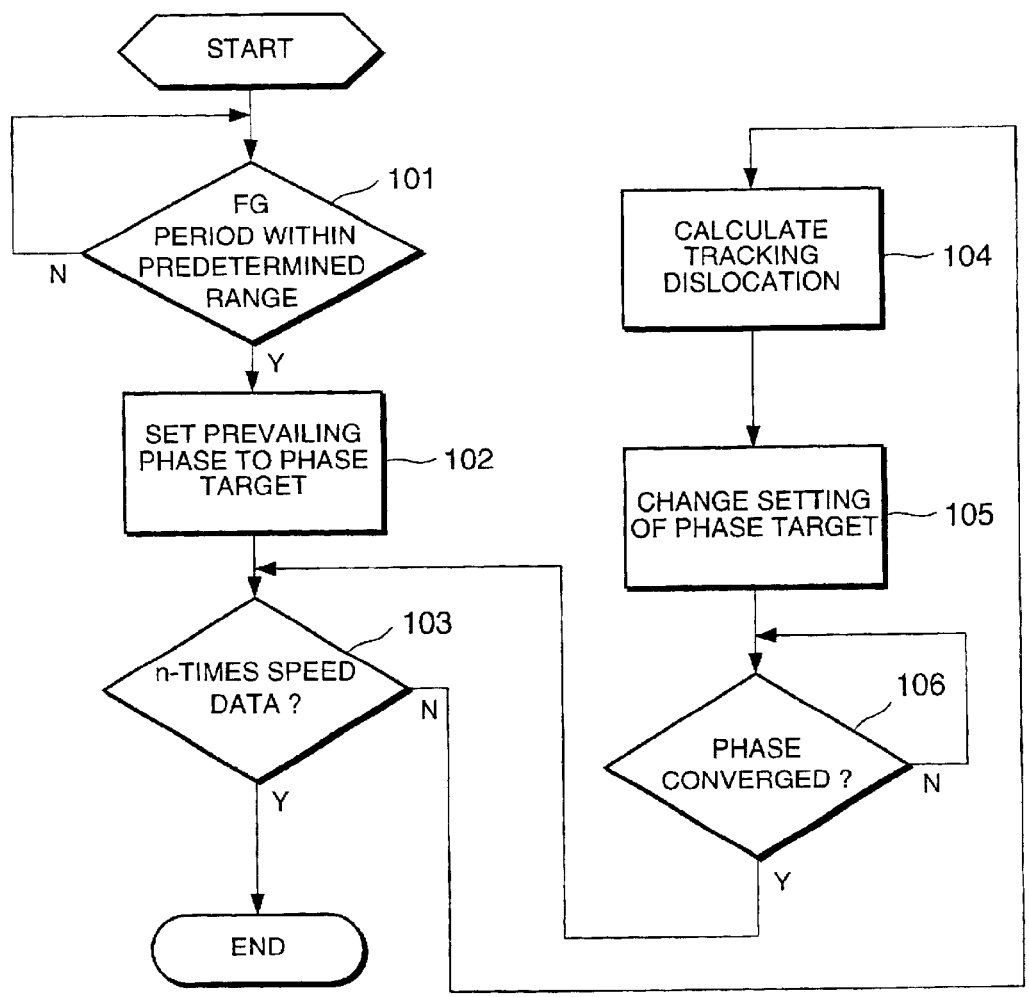
FIG. 5 is a flow chart showing the detail of the actions of the system in Embodiment 2 of the invention.

On the basis of the dislocation of the tracking position discriminated by the head position detector 21, the phase target for the tracking to be converged is changed by the phase control circuit 9. FIGS. 3 and 4 are explanatory diagrams of the tracking convergence positions. The DFF signal is a signal which is synchronized with one rotation of the drum 1, and the heads 2 to contact with the magnetic tape is switched at the two edges (i.e., the rise and fall of the signal). The one ch1 of the heads 2, as mounted on the drum 1 diametrically oppositely by 180 degrees, contacts with the magnetic tape 6, when the DFF signal is at the high level, but the opposite one ch2 contacts with the magnetic tape when at the low level.

In order that the head may scan the recording tracks at the reproduction, i.e., in order to acquire the tracking at the reproduction, it is necessary to control the CTL signal (indicated by arrow), as corresponding to the track number 4, and the DFF signal (indicated as to fall in FIG. 3) to a predetermined phase relation (or to the phase target).

In the phase relation between the DFF signal and the CTL signal of FIG. 3, the head ch1 scans, just after changed, the magnetic tape from the track No. 9. If the phase relation of FIG. 4 is established (after the head was changed) by changing the phase target, however, the head ch1 scans the magnetic tape from the track No. 5 so that the head 2 can scan the video data for the n-times speed. The hatched portions are the SYNC blocks in which the video data for the n-times speed are recorded.

By thus changing the phase target in the phase control circuit 9 on the basis of the output of the head position detector 21, it is possible to achieve the tracking at the proper position at the n-times speed. As a matter of fact, the drum 1 and the head 7 are spaced from each other so that the CTL signals corresponding to the individual tracks are recorded at the spaced positions on the tape 6. In this embodiment, however, the description is simplified assuming that the CTL signals are just below the tracks.

On the basis of the track numbers and the SYNC block numbers recorded all over the tracks, the tracking dislocations at the n-times speed reproductions are determined, and the phase relation between the DFF signal indicating the rotational phase of the drum 1 and the CTL signal is controlled to a predetermined phase in accordance with the speed of the high-speed reproduction so that the quick phase convergence can be effected to adjust the tracking quickly.

Embodiment 2:

This embodiment will be described on a tracking adjustment different from that of Embodiment 1. The construction of an information recording/reproducing system of this embodiment is substantially similar to that of the information recording/reproducing system shown in FIG. 1.

First of all, a high-speed reproduction of the n-times speed is performed in the information recording/reproducing system. When the system is started at the n-times speed so that the rotating speed of the capstan motor 3 reaches a value within a predetermined range with respect to the target of the rotating speed necessary for the n-times speed reproduction, the phase is once replaced by the phase target for the tracking control no matter what phase relation the drum 1 (or the DFF signal) and the track (or the CTL signal) might take. Then, the tracking is quickly stabilized to produce the reproduced data so that its position can be discriminated quickly by the time period to acquire the n-times speed image quickly. This will be detailed in the following.

Figure 6:
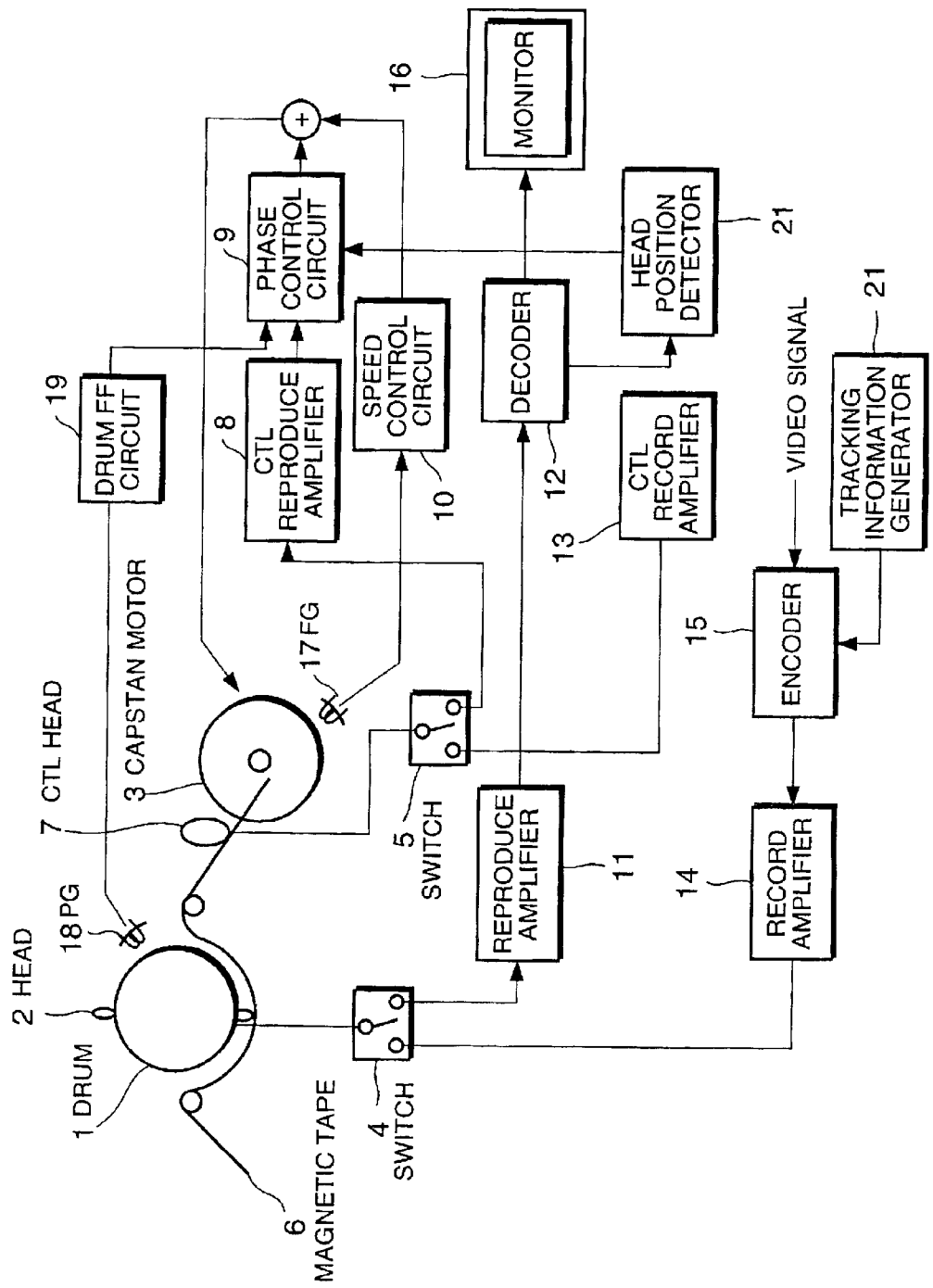
FIG. 6 is a diagram showing a system according to Embodiment 3 of the invention.

With reference to the flow chart of FIG. 6, here will be described the actions of the phase control circuit and the head position detector 21.

First of all, when the information recording/reproducing system is operated for the n-times high-speed reproduction, the rotating speed of the capstan motor 3 is accelerated to the n-times speed so that the magnetic tape starts the high-speed run. At Step 101, there is measured the period of the FS signal or the signal indicating the rotating speed of the capstan motor 3. If the period of the FS signal is outside of a predetermined range, the period is continuously decided at Step 101. This predetermined range of the period of the FS signal means a predetermined error range from the FG period at the target rotating speed of the capstan motor 3. The predetermined range can be set within 10% of the FG period at the target rotating speed of the capstan motor 3. If within the predetermined range, the routine transfers to Step 102, at which the phase control is started by setting the phase relation between the DFF signal and the CTL signal of the drum 1 in the prevailing state to the phase target, and the routine transfers to Step 103. As a result, of the phase control, the phase relation between the DFF signal and the CTL signal hardly fluctuates between Step 102 and Step 103 so that the stable tracking state quickly prevails.

At Step 103, it is decided whether or not the reproduced video data have contained (or can have reproduced) the video data of the track corresponding to the specific CTL signal to be used for the phase control at the n-times speed. If the video data of the track corresponding to the specific CTL signal to be used for the phase control at the n-times speed have been stably obtained (or can have been produced), the series of operations are ended for a control to keep the tracking.

If the video data of the track corresponding to the specific CTL signal to be used for the phase control at the n-times speed have not been obtained (or cannot have been produced), the routine transfers to Step 104, at which the track number and the SYNC block number of the one-time speed, as could be reproduced in place of the video data of the track corresponding to the specific CTL signal to be used for the phase control at the n-times speed, are determined to determine the tracking dislocation on the basis of the determined track number and SYNC block number.

Next, the routine transfers to Step 105, at which the phase target of the CTL signal for the DFF signal of the drum 1 is changed according to the tracking dislocation, and the routine transfers to Step 106. At Step 106, it is decided whether or not the phase has been converged with respect to the changed phase target. If this answer is YES, the routine transfers to Step 103, at which it is decided again whether or not the n-times speed data have been reproduced. If the phase is not converged, the routine transfers to Step 104, and the series of operations from Step 104 to Step 106 are repeated.

By these operations, the phase relation between the DFF signal and the CTL signal can be quickly converged to the tracking position at which the desired n-times speed data are obtained.

The phase target can be determined in the following manner. The track number and the SYNC block number of the one-time speed data, as could be reproduced in place of the video data of the track corresponding to the specific CTL signal to be used for the phase control at the n-times speed, are determined, and the tracking dislocation is determined on the basis of the determined track number and SYNC block number. Where the tracking is delayed by two tacks, for example, the phase target is shortened by one track.

Embodiment 3:

In Embodiments 1 and 2, the tracking dislocation is determined by using the track numbers, as written in the whole track area on the magnetic tape, and the SYNC block numbers indicating the locations of the data in the track, so that the controls are made to achieve the proper tracking position.

In Embodiment 3, at the recording time, the dislocation information of the tracking with respect to the n-times speed reproduced data is recorded in advance in the region over the track, as can be recorded freely to some extent on the side of a recorder, so that the phase target or the convergence target of the phase difference between the DFF signal and the CTL signal in the phase control is changed and converged to the proper tracking position at the n-times speed reproduction time on the basis of the dislocation information. In the recording format of the D-VHS, not only the video and sound data but also additional data can be recorded in the tracks. Therefore, the additional data may always be recorded at the fixed positions of the track and may never fail to contain the track dislocation information.

Next, Embodiment 3 will be described with reference to FIG. 6. FIG. 6 shows an information recording/reproducing system which is enabled to record the tracking dislocation information of the n-times speed reproduction at the time of recording the video information. Here will be omitted the description of the same portions as those of Embodiment 2. In FIG. 6, numeral 22 designates a tracking information generator for adding the tracking information to be recorded in the additional data region, to the video data. The actions at the recording/reproducing time are identical to those of Embodiment 1 except that the tracking information is added to the video data and recorded, so that their description will be omitted.

First of all, when the video data are to be recorded in the magnetic tape, the tracking informations are recorded in the individual tracks. These tracking informations indicate the tracking dislocations from the tracks in which the video data of the track corresponding to the specific CTL signal to be used in the phase control at the n-times speed are recorded.

At the n-times speed reproduction, the phase relation between the DFF signal of the drum 1 and the CTL signal takes a predetermined phase difference. When the tracking is converged, the tracking information is extracted by the head position detector 21 to discriminate the head position.

Figure 7:
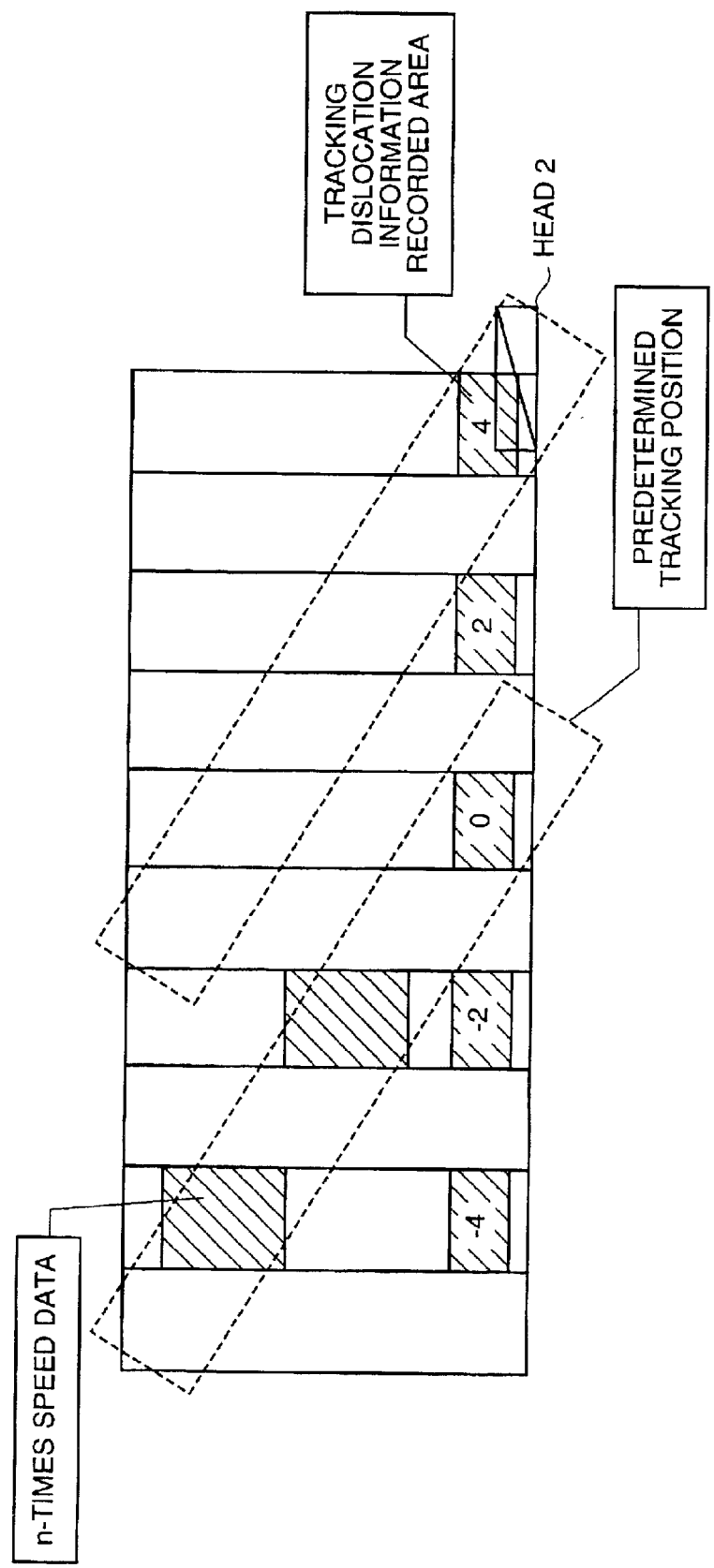
FIG. 7 is an explanatory diagram showing an example of detection of tracking information by a system of Embodiment 3 of the invention.

Specific description will be made with reference to FIG. 7 showing a detection example of the tracking information. In FIG. 7, the tracking is converged at a four-track dislocated position. At this time, the track dislocation information of "4", as recorded in a predetermined area, is reproduced together with the video data. The reproduced video data are inputted from the reproduce amplifier 11 to the decoder 12. The video data, as outputted from the decoder 12, are inputted to the head position detector 21. This head position detector 21 detects the track dislocation information and outputs the information to the phase control circuit 9. In accordance with the tracking dislocation information, the phase control circuit 9 changes the phase target by four tracks and adjusts the tracking.

Since the tracking information is recorded in advance at a value corresponding to the dislocation of the track, the phase target may be set according to that value. Thus, the tracking dislocation information itself is recorded by using the area which can be freely recorded at the recording time. Without any excessive operation for determining the tracking dislocation from the track number of the positional information in the track, therefore, the tracking dislocation can be known to make a convergence quickly into the proper tracking position (or to determine the tracking position).

Embodiment 4:

At the n-times speed reproduction in Embodiment 3, as in Embodiment 2, when the rotating speed of the capstan motor 3 comes into a predetermined range with respect to the target value, the tracking is quickly stabilized by once replacing the phase by the phase target and by controlling it, no matter what the phase relation between the drum 1 and the track (or the CTL signal) might be. From this state, moreover, the tracking dislocation may be determined to acquire the tracking information earlier. In this case, the n-times speed image can be displayed more quickly than that of the case in which the tracking suited for the n-times speed reproduction is determined from the first time.

The flow chart to decide whether or not the rotating speed of the capstan motor 3 is within a predetermined range and to change the phase target is identical to that of the case of Embodiment 2, so that its description will be omitted. The subsequent operation to change the tracking to the proper position is also identical to that of Embodiment 3, so that its description will be omitted.

Figure 8:
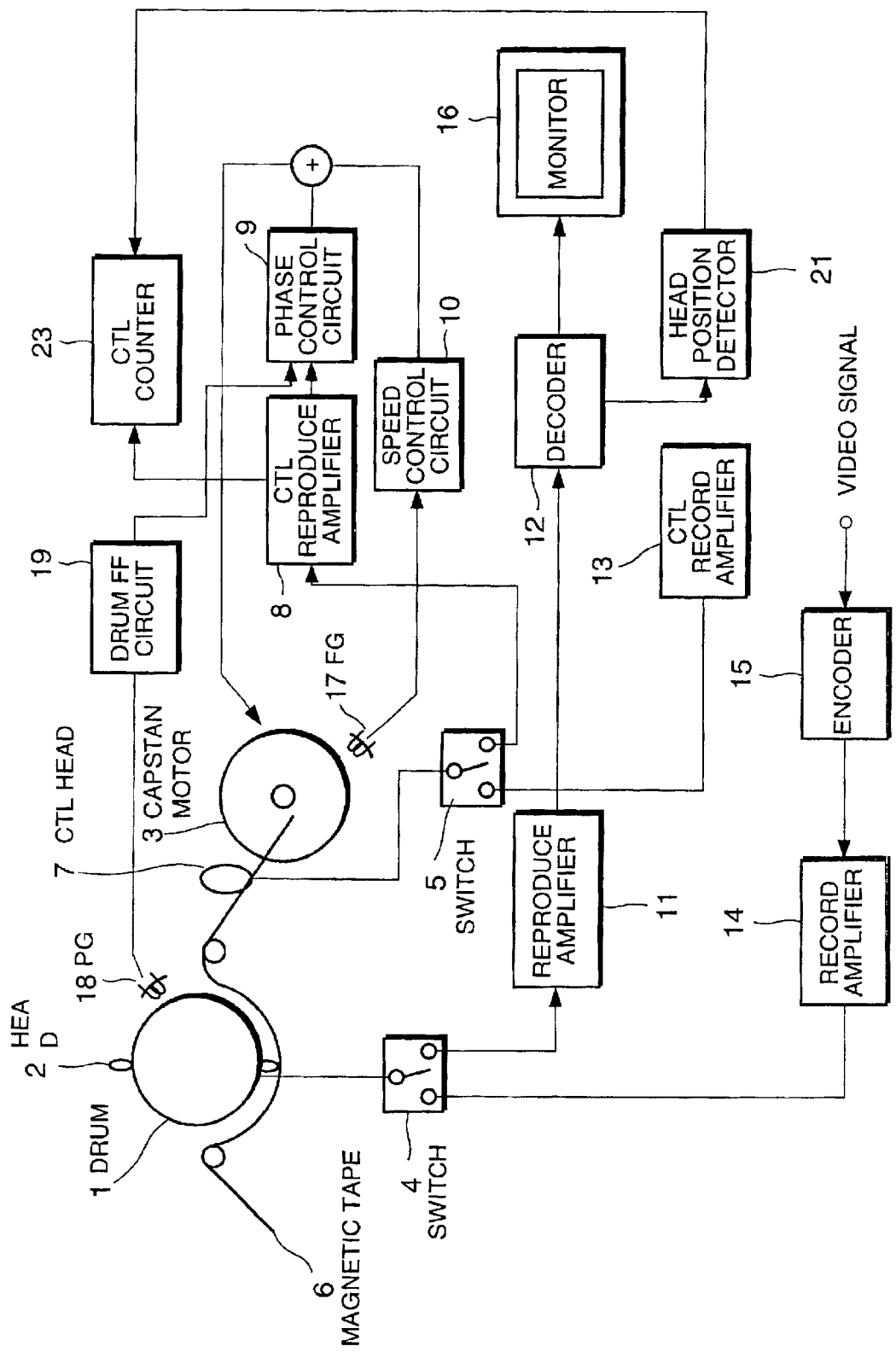
FIG. 8 is a diagram showing a construction of a system according to Embodiment 5 of the invention.

Embodiment 5:

In Embodiment 4, an adjustment is made to the proper tracking position on the basis of the tracking information recorded in the track of the video data. However, the proper tracking may be achieved by counting the control signals which are recorded in the tape lower end in synchronism with the tracks. FIG. 8 is a diagram showing a construction of a system of Embodiment 5. In FIG. 8, numeral 23 designates a CTL counter for counting the CTL signals reproduced. The remaining portions are identical to those of the information recording/reproducing system of FIG. 1.

At the n-times speed reproduction, it is ordinary that the phase control is made by dividing the CTL signal into n-frequencies so that one pulse may be produced at one rotation of the drum 1. Depending on the selection (to start what position the division of n-frequencies is to be started) of the CTL signal, there are selected n-tracking positions.

In order to achieve the proper tracking position, therefore, at the head position detector 21, the desired CTL signal to be intrinsically selected at the n-frequency division is decided from the track information of the video data reproduced at the ordinary reproduction time. If the CTL signal is the desired one, the initialization command of the counted value is sent to the CTL counter 23. At this CTL counter 23, the counted value is initialized according to the command, and the initialized value is sent to the phase control circuit 9.

Thus, the counted value is 0 when the desired CTL signal is reproduced. When a similar operation is also continued at the n-times speed start so that the output of the FG unit 17 falls within a predetermined range, the phase control is started by using the CTL signal which has been divided into the n-frequencies at the phase control circuit 9. If the CTL signal at the counted value 0 is always selected and used for the phase control, the desired tracking position can always be obtained to produce the n-times speed reproduced image promptly and stably. The predetermined range means a predetermined error range in which the FG signal period of the FG unit 17 falls with respect to the FG signal period at the speed target for the speed control.

Figure 9:
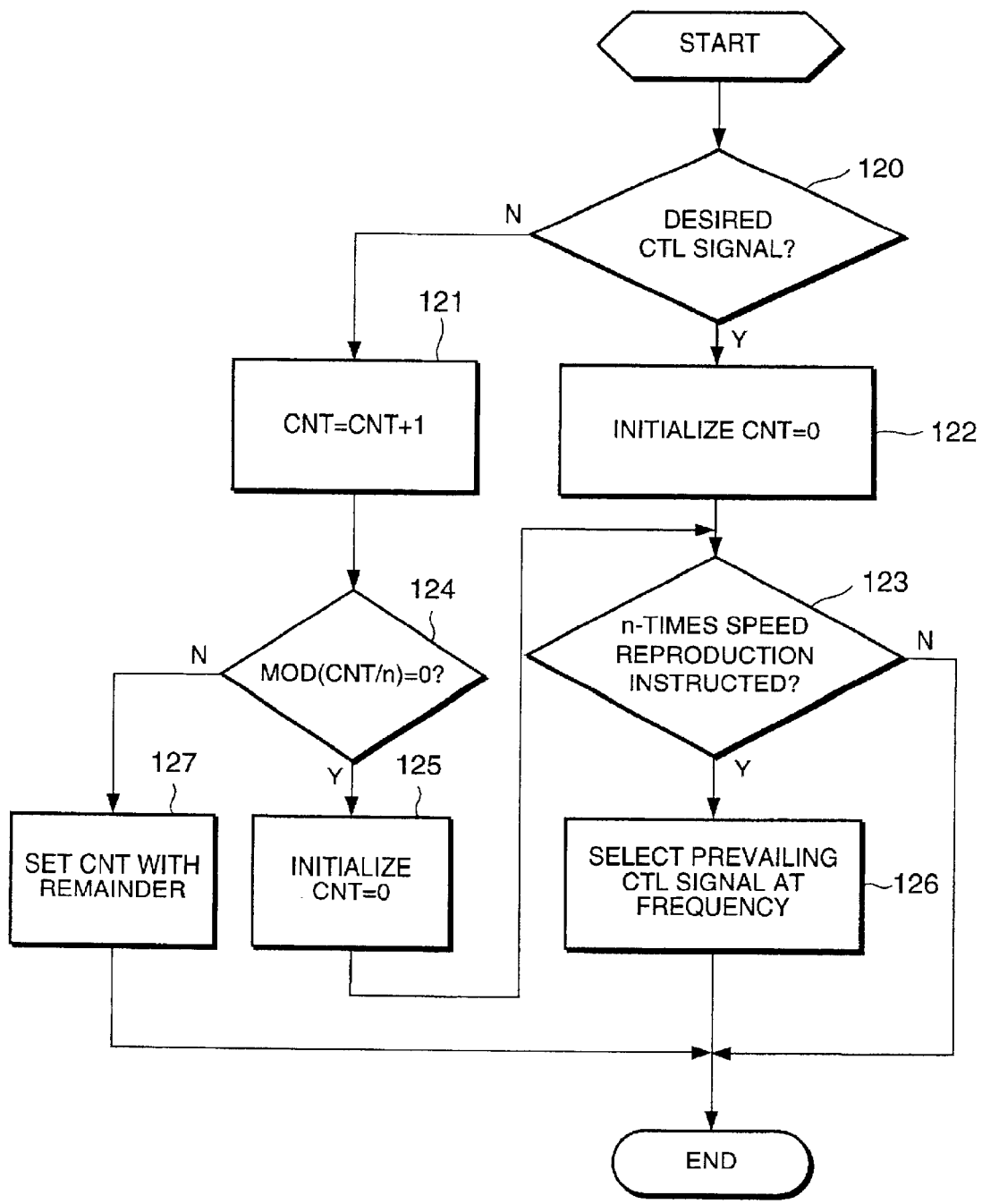
FIG. 9 is a flow chart showing the detail of the actions of the system according to Embodiment 5 of the invention.

A more detailed description will be made with reference to a flow chart shown in FIG. 9. The operations of the flow chart shown in FIG. 9 are performed in the CTL counter 23.

Here will be described the operations. First of all, when the reproduction is started, the CTL signal and the video data are reproduced. The CTL signal is reproduced by the CTL head 7 and is inputted through the CTL reproduce amplifier 8 to the phase control circuit 9. Here are started the operations from Step 120 each time the CTL signal is inputted. At Step 120, it is decided from the video data reproduced to correspond to the CTL signal whether or not the reproduced CTL signal is suitably used for the phase control (i.e., the tracking control) of the capstan motor at the n-times speed reproduction. For example, the CTL signal may be suitable if it corresponds to the video data for the n-times speed to be scanned at first at the n-times speed. Here, the routine transfers to Step 122, if the CTL signal is the desired one, but otherwise to Step 121.

At Step 122, a counted value CNT of the CTL signals is initialized to 0, and the routine transfers to Step 123.

At Step 121, the value CNT is incremented by 1, and the routine transfers to Step 124. At Step 124, there is determined the remainder of CNT/n. Here, letter n designates a value indicating how many times the high-speed reproduction is done as high as the tape running speed for the ordinary reproduction. If the remainder of CNT/n of Step 124 is 0, the routine transfers to Step 125. At Step 125, an initialization is made by CNT=0, and it is then decided at Step 123 whether or not the n-times speed reproduction is instructed. With the instruction of the n-times speed, the prevailing CTL signal is selected at Step 126 for the reference at the time of frequency division when the running speed becomes stable. Thus, the tracking at the n-times speed reproduction can be obtained, and the routine is ended.

In case that the value CNT/n has a remainder at Step 124, on the other hand, the routine transfers to Step 127, at which the remainder determined at Step 124 is reset as the CNT value. Then, the routine is ended. When the CTL signal is inputted again to the phase control circuit 9, the operations from Step 120 are started while keeping the CNT value reset at Step 127.

If the n-times speed reproduction is not instructed at Step 123, on the other hand, the routine is ended. When the CTL signal is inputted again to the phase control circuit 9, the series of operations from step 120 are started while keeping the CNT=0, as initialized at Step 125.

Here, these series operations are not performed after the frequency division at Step 126. This means that the series of operations are not performed during the n-times speed reproduction after the transfer to this n-times speed reproduction. Where the ordinary reproduction is restored, those series of operations may be performed again.

Figure 10:
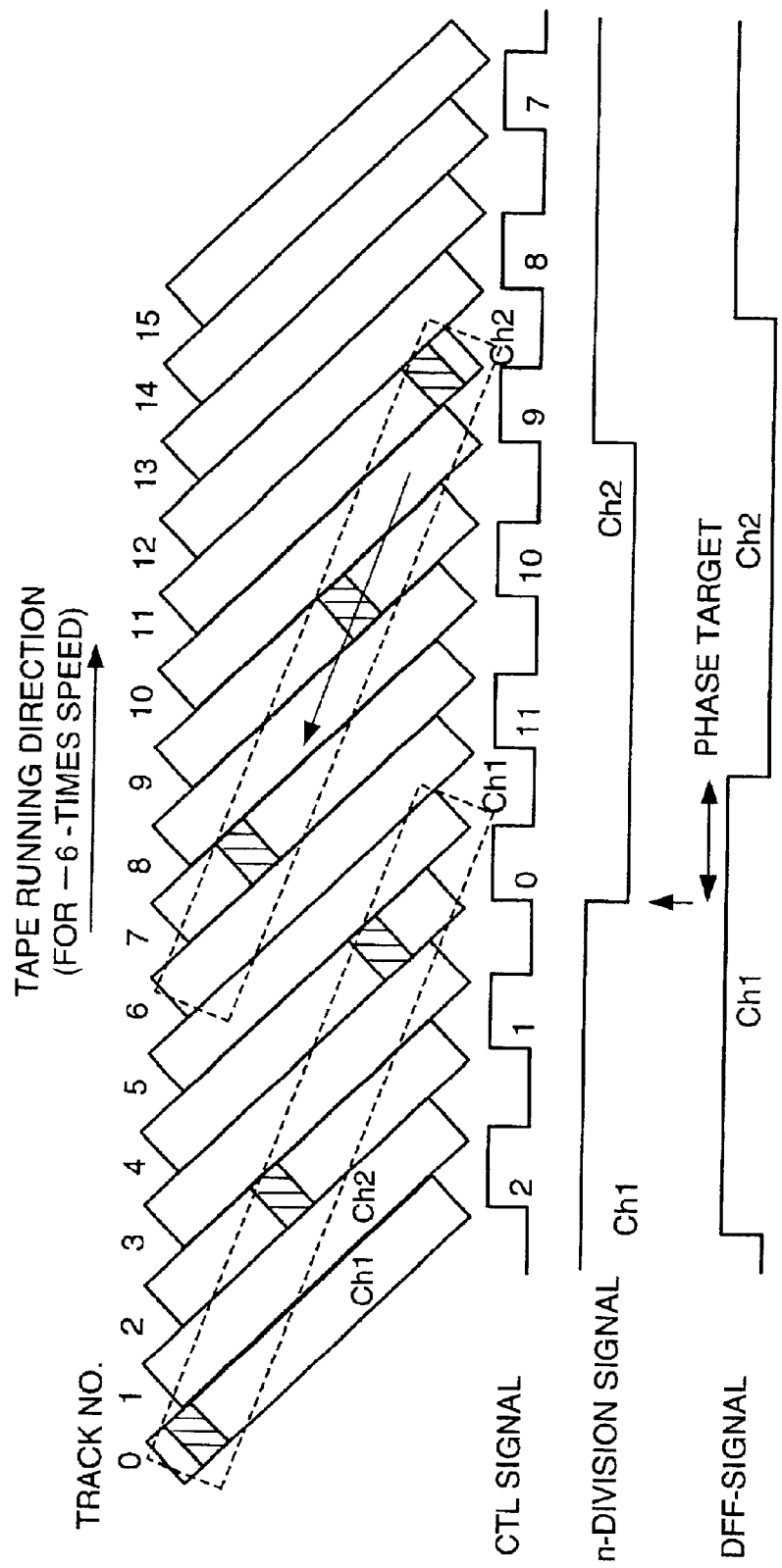
FIG. 10 is an explanatory diagram showing a convergence of tracking by the system of Embodiment 5 of the invention.

FIG. 10 shows phase relations between the DFF signal indicating the phase of the drum 1 at the n-times speed and the CTL signal. Here is shown the case of −12 times speed. This −12 times speed means the high-speed reproduction of 12 times speed in the direction reversed from that of the ordinary reproduction.

For the n-times speed reproduction, the CTL signal of the phase of the counted value 0 may be selected at the frequency division time to keep the phase target (i.e., the hatched phase differences), as shown in FIG. 10, at all times with respect to the rise of the DFF signal. As a result, it is possible to keep the tracking at the n-times speed reproduction.

In case that the video data of the track corresponding to the specific CTL signal to be used in the phase control at the n-times speed can be detected from the video data thus reproduced at the ordinary reproduction thereby to discriminate the desired CTL signal corresponding to those video data, it is enabled to discriminate by counting the CTL signals whether or not the CTL signals match the tracking at the n-times speed reproduction. As a result, the predetermined tracking position can be quickly matched at the n-times speed reproduction.

According to the fifth embodiment, there is also provided an information reproducing method comprising discriminating the video data of a track, in which reproduced video data correspond to a specific CTL signal to be used for a phase control at an n-times speed, at an ordinary reproduction; if the reproduced video data are not those of the track corresponding to the specific CTL signal to be used for the phase control at the n-times speed, increasing the counted value of the CTL signal and dividing the increased counted value by n, instructing, if the remainder of the division is 0, the n-times speed reproduction and deciding whether or not the tape speed is at the n-times speed, effecting the n-times speed reproduction, if the foregoing conditions are satisfied, by dividing the CTL signal into n-frequencies with reference to the CTL signal, and setting the remainder, if any, as the counted value of the CTL signal, and repeating the operations again, as started from the step to discriminate the video data of the track, in which the reproduced video data correspond to the specific CTL signal to be used for the phase control at the n-times speed; or if the reproduced video data are those of the track corresponding to the specific CTL signal to be used for the phase control at the n-times speed, initializing the counted value of the CTL signal to 0, instructing the n-times speed reproduction and deciding whether or not the prevailing tape speed is at the n-times speed, and effecting the n-times speed reproduction, if the foregoing conditions are satisfied, by dividing the CTL signal into n-frequencies with reference said CTL signal; and if the instruction of the n-times speed reproduction and the tape running speed fail to satisfy the conditions for the n-times speed, performing the operations again, as started from the step to discriminate the video data of the track, in which the reproduced video data correspond to the specific CTL signal to be used for the phase control at the n-times speed. By counting the CTL signals, therefore, the desired CTL signal can be discriminated from the counted value. On the basis of this CTL signal, the phase control of the signal divided from the CTL signal into the n-frequencies can be made to adjust the tracking position to the proper one thereby to produce the reproduced image of the n-times speed quickly.

Embodiment 6:

In Embodiment 5, every time the desired CTL signal matching the tracking of the n-times speed reproduction is detected at the ordinary reproduction (i.e., the one-time speed), it is decided whether or not the n-times speed reproduction is instructed. If the n-times speed reproduction is instructed, the CTL signal is divided into n-frequencies with reference to its position thereby to control the phase relation between the DFF signal indicating the rotational phase of the drum 1 and the CTL signal.

In Embodiment 6, on the other hand, all the CTL signals are detected to decide at each detection whether or not the n-times speed is instructed and whether or not the predetermined range of the n-times speed is entered. If these two conditions are satisfied, the proper tracking position may be obtained by referring to the CTL signal at the instant of the predetermined range for the n-frequency division and by changing the phase target on the basis of the CTL signal referred to. Here, the construction of the system is similar to that of the information recording/reproducing system of FIG. 8.

Here will be described the operations.

At the n-times speed reproduction, it is ordinary to make the phase control by dividing the CTL signal into n-frequencies so that one pulse may be established for one drum rotation. At this time, the n-tracking positions may be selected in dependence upon what position of the CTL signal the frequency division is to be made with reference to.

First of all, for the tracking at the n-times speed reproduction from the track information of the video data reproduced at the ordinary time, there is discriminated the desired CTL signal to be intrinsically selected at the n-times speed. At this time, the CTL signals are counted each time they are reproduced. At every time the desired CTL signal to be intrinsically selected is selected, the counted value if initialized. Therefore, the counted value is 0 when the desired CTL signal is reproduced.

Next, when the desired CTL signal is reproduced, the n-times speed reproduction is instructed. If the output of the FG unit 17 of the capstan motor 3 falls within a predetermined range, the phase control is started by using the CTL signal which has been divided into the n-frequencies by the phase control circuit 9. At this time, the phase target of the phase control is changed according to the counted value of the selected CTL signals. Then,the same tracking can always be obtained to provide the stable n-times speed image quickly.

Figure 11:
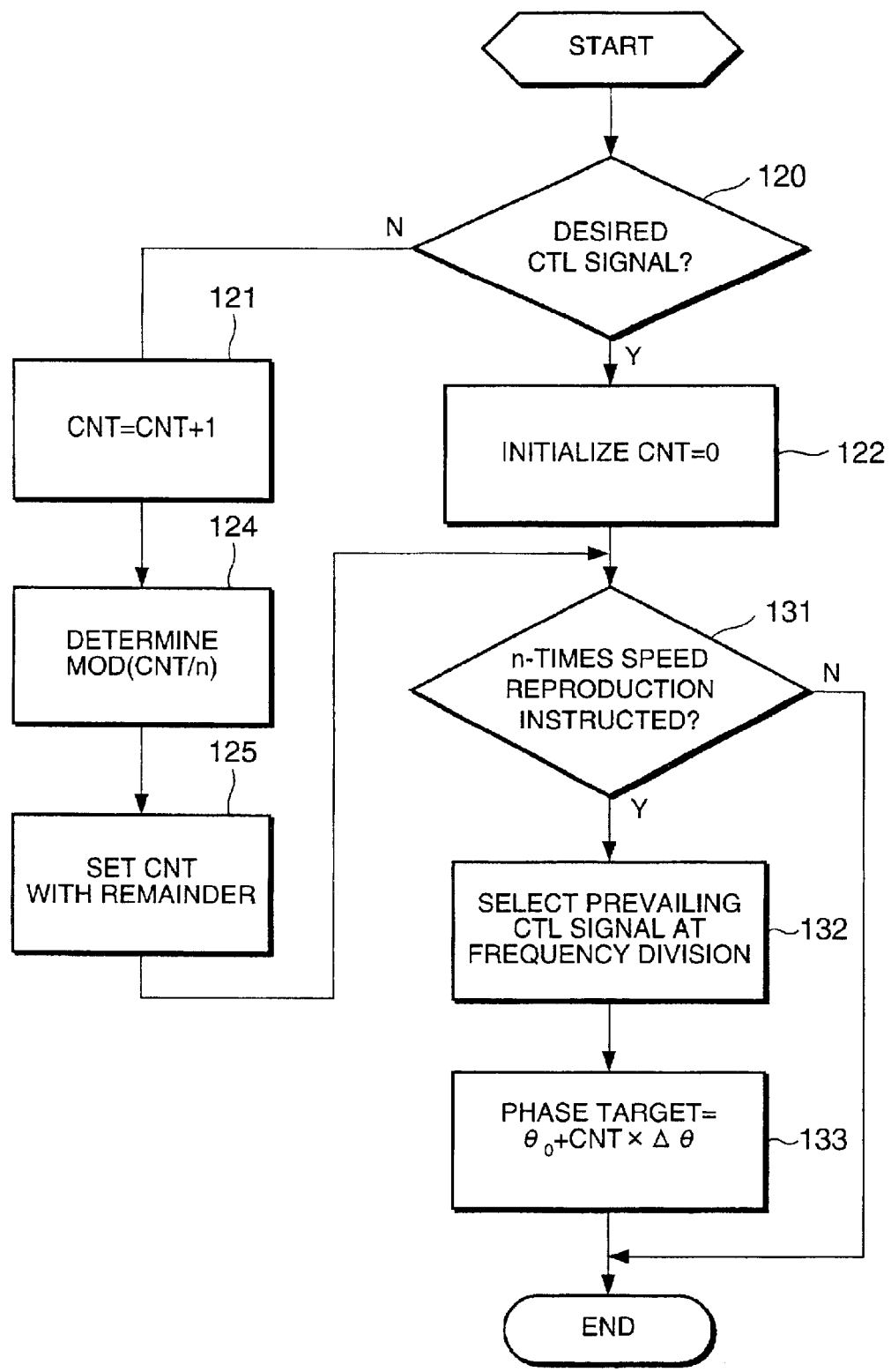
FIG. 11 is a flow chart showing the detail of the actions of the system in Embodiment 6 of the invention.

FIG. 11 is a flow chart showing the operations of a tracking control of this embodiment. The routine, as shown in this flow chart, is performed by the CTL counter 23.

Here will be described the operations. When the reproduction is started at first, the CTL signal and the video data are reproduced. The CTL signal is reproduced by the CTL head 7 and is inputted through the CTL reproduce amplifier 8 to the phase control circuit 9. Here are started the operations of Step 120 each time the CTL signal is inputted. At Step 120, it is decided from the video data reproduced to correspond to the reproduced CTL signal whether or not the CTL signal is suited for the tracking at the n-times speed reproduction. For example, this decision is to decide whether or not the reproduced CTL signal corresponds to the video data for the n-times speed reproduction to be scanned at first for the n-times speed. The routine transfers to Step 122, if the desired CTL signal is detected at Step 120, but otherwise to Step 121.

At Step 121, the counted value CNT of the CTL signal is incremented by 1, and the routine transfers to Step 124. At Step 124, there is determined the remainder of CNT/n. Here, letter n designates a value indicating how many times the high-speed reproduction is done as high as the tape running speed for the ordinary reproduction (at the one-time speed). At Step 125, the remainder, as determined at Step 124, is reset as the CNT value of the CTL signal. If the remainder is not determined at Step 124, the CNT value is set with 0. Next, the routine advances to Step 131.

At Step 122, the CNT value is initialized to 0, and the routine advances to Step 131. The operations at and after Step 131 are those in the phase control circuit 9. At Step 131, it is decided whether or not the n-times speed reproduction is instructed. With this instruction of the n-times speed reproduction, the routine advances to Step 132, at which the prevailing position of the CTL signal is made as the reference for the division of n-frequencies. Without the instruction, the routine is ended.

At next Step 133, the phase target is changed by the following Formula on the basis of the CNT value of the prevailing CTL signal. The Formula for determining the phase target is expressed, for a phase target $\theta$ in the phase control for CNT=0 and for a phase difference $\Delta\theta$ of the CTL signals of one track, by:

Phase Target $\theta' = \theta + CNT \times \Delta\theta$.

By this Formula, the phase target $\theta'$ is determined for substitution, and a series of operations are ended. Here are not performed these series of operations after the frequency division.

Figure 12:
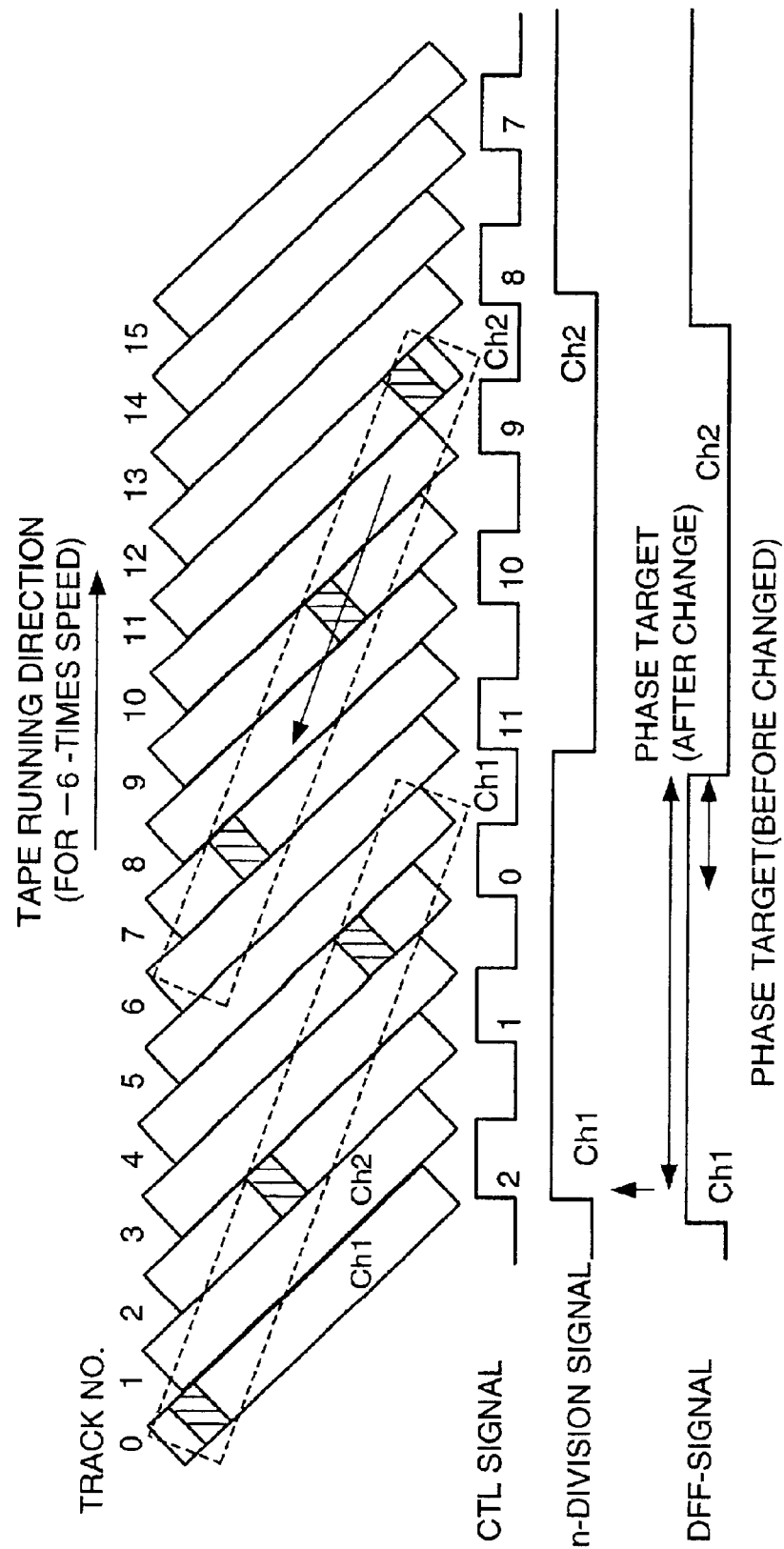
FIG. 12 is an explanatory diagram showing the convergence of tracking by the system of Embodiment 6 of the invention.
Figure 13:
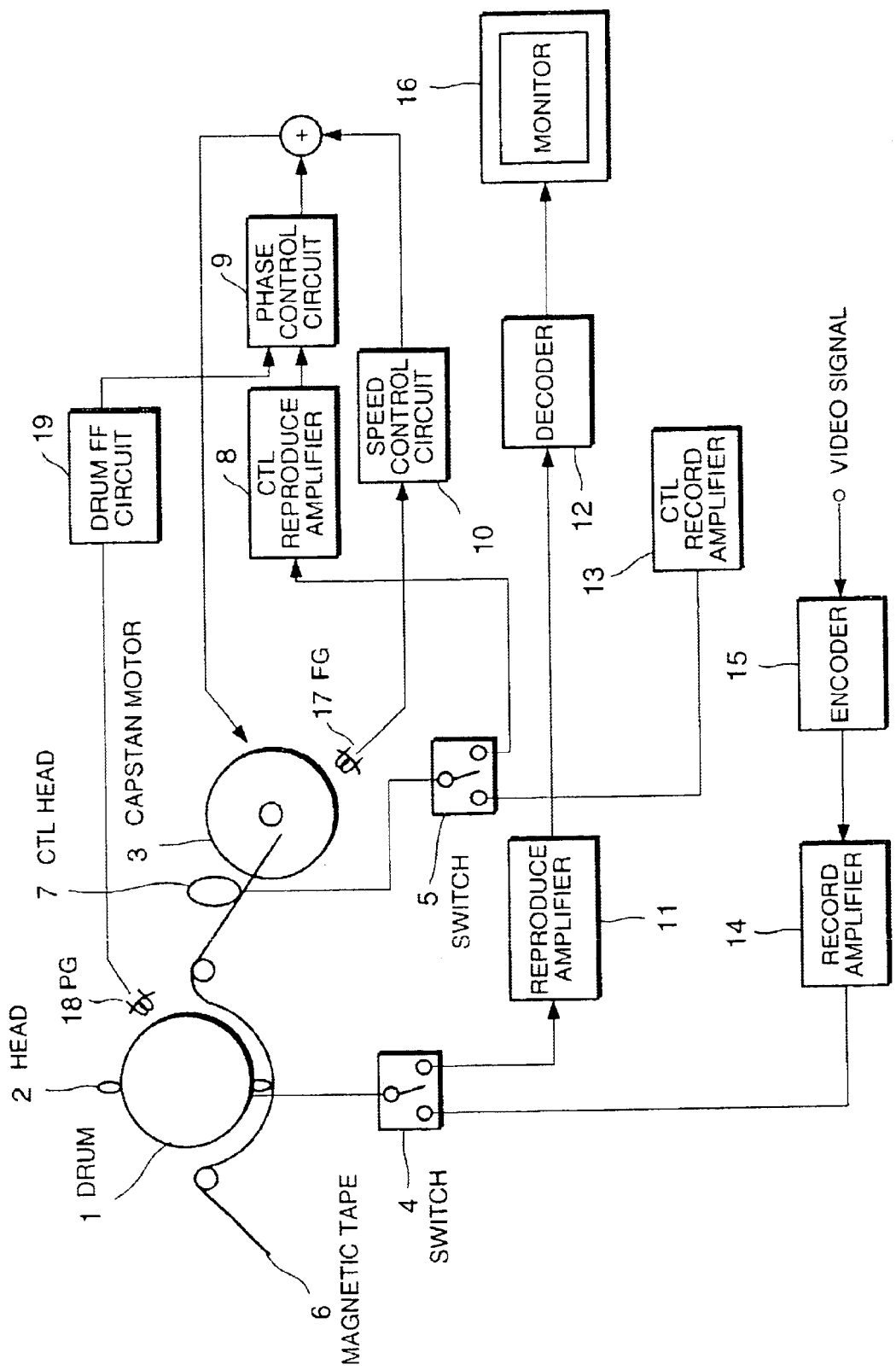
FIG. 13 is a diagram showing a construction of a system of the prior art.
Figure 14:
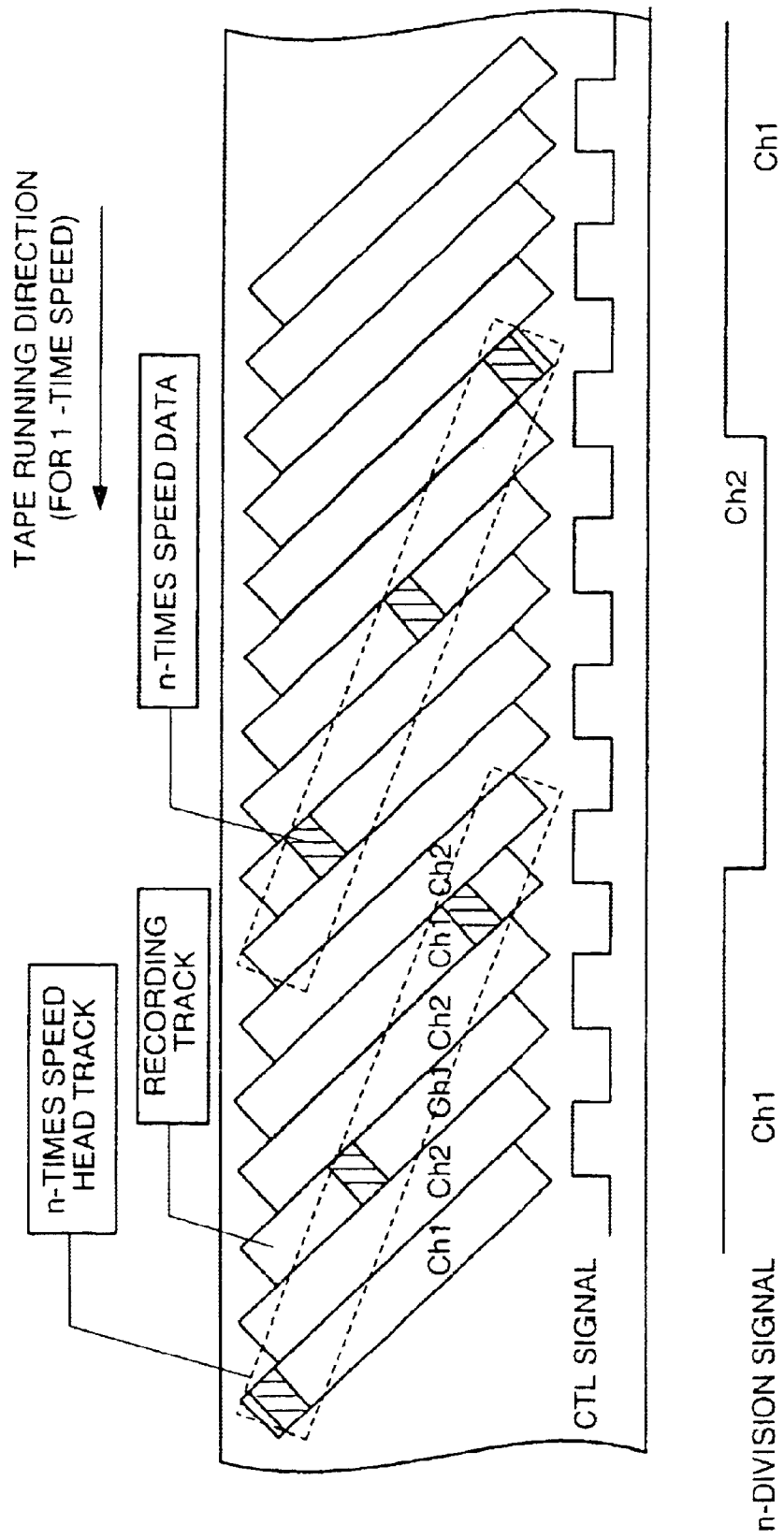
FIG. 14 is a format diagram of a recording track in a VTR of the prior art.

FIG. 12 shows the phase relation at the n-times speed between the DFF signal indicating the phase of the drum 1 and the CTL signal. In FIG. 12, the numerals, as attached to the CTL signals, indicate the CNT values of the CTL signals. In FIG. 12, the position of the CTL signal at the CNT value=2 is selected as the reference for the n-frequency division. According to the CNT value=2 of the CTL signal at this time, the phase target is changed. At the CNT value=2, the phase difference corresponding to the two CTL signals are added to the phase target. By thus changing the phase target according to the CNT value, the phase can be so controlled at all times as is shown in FIG. 12 with respect to the rise of the DFF signal thereby to keep the tracking at the n-times speed. In FIG. 12, the CTL signal in the phase of the counted value 2 is selected at the frequency division. By changing the phase target corresponding to the counted value 2, the phase can be so controlled at all times as is shown in FIG. 12 with respect to the rise of the DFF signal thereby to keep the tracking at the n-times speed.

When the data of the track corresponding to the desired CTL signal can thus be once reproduced at the ordinary reproduction, the CTL signals are then counted to change the phase target according to the CNT value of the CTL signals selected at the n-times speed. At the n-times speed, therefore, the tracking position can be quickly adjusted to the desired one to display the image of the n-times speed reproduction.

According to the sixth embodiment, there is also provided an information reproducing method comprising discriminating the video data of a track, in which reproduced video data correspond to a specific CTL signal to be used for a phase control at an n-times speed, at an ordinary reproduction; if the reproduced video data are not those of the track corresponding to the specific CTL signal to be used for the phase control at the n-times speed, increasing the counted value of the CTL signal and dividing the increased counted value by n, and setting the remainder as the counted value of the CTL signal; or if the reproduced video data are those of the track corresponding to the specific CTL signal to be used for the phase control at the n-times speed, initializing the counted value of the CTL signal to 0; instructing the n-times speed reproduction and deciding whether or not the prevailing tape speed is at the n-times speed, and effecting the n-times speed reproduction, if the foregoing conditions are satisfied, by dividing the CTL signal into n-frequencies with reference to the CTL signal; changing the phase of the signal to be divided into the n-frequencies, in accordance with the counted value of the CTL signal of the reproduced video data; and if the instruction of the n-times speed reproduction and the tape running speed fail to satisfy the conditions for the n-times speed, effecting the n-times speed reproduction by performing the operations again from the step to discriminate the video data of the track, in which the reproduced video data correspond to the specific CTL signal to be used for the phase control at the n-times speed. At the n-times speed reproduction, therefore, the phase dislocation from the desired CTL signal can be discriminated. According to this phase dislocation, the phase control of the signal divided into the n-frequencies from the CTL signal can be made to adjust the tracking position quickly to the proper one thereby to produce the reproduced image quickly.

The invention can produce the following effects.

According to a first aspect of the invention, there is provided an information reproducing system having a track format in which informations for an n-times speed reproduction (wherein n indicates an integer) are arranged in advance at predetermined positions on a recording track of a recording medium, which system comprises: control signal reproducing means for reproducing a control signal indicating the positional relation of the track recorded in the recording medium; a rotary drum including a head for reproducing data signals from the recording medium; drum phase signal outputting means for outputting a signal indicating the rotational phase of the rotary drum; head dislocation detecting means for determining, after a head scanning portion to be reproduced by the head at the n-times speed reproduction and the n-times speed reproduction were set, a dislocation from the track position to be reproduced; and phase control means for controlling the phase relation between the output of the control signal reproducing means and the output of the drum phase signal outputting means, on the basis of the dislocation determined by the head dislocation detecting means. Since the head dislocation at the n-times speed reproduction can be determined, therefore, the tracking position can be quickly adjusted, even if dislocated from the normal one, to the proper tracking position to produce the reproduced image of the n-times speed.

According to a second aspect of the invention, the above head dislocation detecting means determines the dislocation from the recording position, at which the recording data to be reproduced at the n-times speed reproduction are recorded, by comparing a SYNC block signal indicating the track number, in which the recording data reproduced at the n-times speed reproduction are recorded with a SYNC block number indicating the position in the track and comparing the track number of the recorded data to be reproduced at the n-times speed reproduction with the SYNC block number. Therefore, the tracking position can be more quickly adjusted, even if dislocated from the normal one, to the proper tracking position to produce the reproduced image of the n-times speed quickly.

According to a third aspect of the invention, the above head dislocation detecting means determines the dislocation of such data for the n-times speed reproduction of the recorded data reproduced at the n-times speed reproduction as are recorded at a predetermined position of the recording track, and the track number, at which the recording data of the same SYNC block are recorded. Therefore, the tracking position can be more quickly adjusted, even if dislocated from the normal one, to the proper tracking position to produce the reproduced image of the n-times speed quickly.

According to a fourth aspect of the invention, there is provided an information reproducing system further comprising control means for keeping the phase relation between the CTL signal and the output signal from said drum phase signal outputting means, and the head dislocation detecting means determines the head dislocation from the video data which are reproduced while being controlled by the control means. If the run is stabilized to the running velocity of the n-times speed, therefore, the head dislocation can be determined and can be known earlier even if dislocated from the normal one, so that the tracking position can be more quickly adjusted to the proper tracking position to produce the reproduced image of the n-times speed quickly.

According to a fifth aspect of the invention, there is provided an information reproducing system having a track format in which informations for an n-times speed reproduction (wherein n indicates an integer) are to be arranged in advance at predetermined positions on a recording track of a recording medium, which system comprises: control signal recording/reproducing means for recording/reproducing a control signal indicating the positional relation of the track to be recorded in the recording medium; a rotary drum including a pair of heads for recording and reproducing data signals in and from the recording medium; drum phase signal outputting means for outputting a signal indicating the rotational phase of the rotary drum; tracking information generating means for generating informations on the dislocation of another track with respect to a track in which the recording data for the n-times speed reproduction to be reproduced at first at the n-times speed reproduction are recorded; recording/reproducing means for recording and reproducing video data and for recording and reproducing the informations of individual tracks, as generated by the tracking information generating means, in and from the individual tracks; and phase control means for controlling the phase relation between the output of said control signal reproducing means and the output of the drum phase signal outputting means, at the n-times speed reproduction on the basis of the dislocation recorded by the recording/reproducing means. Even with a dislocation from the normal tracking position at the n-times speed reproduction, therefore, the dislocation can be discriminated from the reproduced data so that the tracking position can be quickly adjusted to the proper one to produce the reproduced image of the n-times speed quickly.

According to a sixth aspect of the invention, there is provided an information reproducing system further comprising control means for keeping the phase relation between the CTL signal and the output signal from the drum phase signal outputting means, and the phase control means controls the phase relation between the output of the control signal recording/reproducing means and the output of the drum phase signal outputting means, on the basis of the head dislocation which is recorded together with the reproduced video data, while being controlled by the control means. If the run is stabilized to the running velocity of the n-times speed, therefore, the dislocation of the head can be discriminated from the reproduced data. Even with a dislocation from the normal track position, the head dislocation can be known earlier so that the tracking position can be more quickly adjusted to the proper one to produce the reproduced image of the n-times speed quickly.

According to a seventh aspect of the invention, there is provided an information reproducing system having a track format in which informations for an n-times speed reproduction (wherein n indicates an integer) are to be arranged in advance at predetermined positions on a recording track of a recording medium, wherein, on the basis of the dislocation between the track position to be reproduced by a head at the n-times speed reproduction and the track position to be reproduced after the n-times speed reproduction was set, the n-times speed reproduction is performed by controlling the phase relation between a control signal indicating the positional relation of the recording track and a drum phase signal indicating the phase of a rotary drum. Therefore, the head dislocation from the track to be intrinsically reproduced at the n-times speed reproduction can be determined, and the tracking position can be adjusted, even if dislocated from the normal one at the n-times speed reproduction, to the proper one more quickly thereby to produce the reproduced image quickly.

What is claimed is:

1. An information reproducing system having a track format in which information for an n-times speed reproduction (wherein n indicates an integer) are arranged in advance at predetermined positions on a recording track of a recording medium, comprising:

control signal reproducing means for reproducing a control signal indicating the positional relation of the track recorded in said recording medium;

a rotary drum including a head for reproducing data signals from said recording medium;

drum phase signal outputting means for outputting a signal indicating the rotational phase of said rotary drum;

head dislocation detecting means for determining, after a head scanning portion to be reproduced by said head at the n-times speed reproduction and the n-times speed reproduction were set, a dislocation from the track position to be reproduced; and phase control means for controlling the phase relation between the output of said control signal reproducing means and the output of said drum phase signal outputting means, on the basis of the dislocation determined by said head dislocation detecting means.

2. An information reproducing system of claim 1, wherein said head dislocation detecting means determines the dislocation from the recording position, at which the recording data to be reproduced at the n-times speed reproduction are recorded, by comparing:

a SYNC block signal indicating the track number, in which the recording data reproduced at the n-times speed reproduction are recorded, with a SYNC block number indicating the position in the track; and by comparing:

the track number of the recorded data to be reproduced at the n-times speed reproduction with the SYNC block number.

3. An information reproducing system of claim 1, wherein said head dislocation detecting means determines the dislocation of such data for the n-times speed reproduction of the recorded data reproduced at the n-times speed reproduction as are recorded at a predetermined position of the recording track, and the track number, at which the recording data of the same SYNC block are recorded.

4. An information reproducing system of claim 1, further comprising:

control means for keeping the phase relation between the CTL signal and the output signal from said drum phase signal outputting means, wherein said head dislocation detecting means determines the head dislocation from the video data which are reproduced while being controlled by said control means.

5. An information reproducing system having a track format in which information for an n-times speed reproduction (wherein n indicates an integer) are to be arranged in advance at predetermined positions on a recording track of a recording medium, comprising:

control signal recording/reproducing means for recording/reproducing a control signal indicating the positional relation of the track to be recorded in said recording medium;

a rotary drum including a pair of heads for recording and reproducing data signals in and from said recording medium;

drum phase signal outputting means for outputting a signal indicating the rotational phase of said rotary drum;

tracking information generating means for generating information on the dislocation of another track with respect to a track in which the recording data for the n-times speed reproduction to be reproduced at first at the n-times speed reproduction are recorded;

recording/reproducing means for recording and reproducing video data and for recording and reproducing the information of individual tracks, as generated by said tracking information generating means, in and from the individual tracks; and phase control means for controlling the phase relation between the output of said control signal reproducing means and the output of said drum phase signal outputting means, at the n-times speed reproduction on the basis of the dislocation recorded by said recording/reproducing means.

6. An information reproducing system of claim 5, further comprising:

control means for keeping the phase relation between the CTL signal and the output signal from said drum phase signal outputting means, wherein said phase control means controls the phase relation between the output of said control signal recording/reproducing means and the output of said drum phase signal outputting means, on the basis of the head dislocation which is recorded together with the reproduced video data, while being controlled by said control means.

7. An information reproducing method for information having a track format in which information for an n-times speed reproduction (wherein n indicates an integer) are arranged in advance at predetermined positions on a recording track of a recording medium, comprising:

performing, on the basis of the dislocation between the track position to be reproduced by a head at the n-times speed reproduction and the track position to be reproduced after the n-times speed reproduction was set, the n-times speed reproduction by controlling the phase relation between a control signal indicating the positional relation of the recording track and a drum phase signal indicating the phase of a rotary drum.

\* \* \* \* \*